US007605553B2

(12) United States Patent
Lee

(10) Patent No.: US 7,605,553 B2

(45) Date of Patent: Oct. 20, 2009

(54) SYSTEM FOR SAFELY OPENING/CLOSING POWER WINDOW OF VEHICLE

(75) Inventor: Chul Ho Lee, Bucheon (KR)

(73) Assignee: Kia Motor Corporation, Seoul (KR)

( * ) Notice: Subject to any disclaimer, the term of this patent is extended or adjusted under 35 U.S.C. 154(b) by 795 days.

(21) Appl. No.: 11/299,372

(22) Filed: Dec. 8, 2005

(65) Prior Publication Data

US 2007/0108928 A1 May 17, 2007

(30) Foreign Application Priority Data

Nov. 11, 2005 (KR) ...................... 10-2005-0108114

(51) Int. Cl.
*H02P 1/00* (2006.01)

(52) U.S. Cl. ....................... 318/282; 318/264; 318/266; 318/466; 318/469

(58) Field of Classification Search ................. 318/282, 318/264, 266, 286, 466, 469
See application file for complete search history.

(56) References Cited

U.S. PATENT DOCUMENTS 5,331,260 A 7/1994 Ahmed
6,278,250 B1 * 8/2001 Sasaki ........................ 318/283
6,396,227 B2 * 5/2002 Sasaki ........................ 318/283
6,975,084 B2 * 12/2005 Sugiura et al. .............. 318/283

FOREIGN PATENT DOCUMENTS

| | | | |
|---|---|---|---|
| DE | 3334317 | A1 | 10/1984 |
| DE | 41 27 638 | A1 | 3/1993 |
| DE | 41 41 715 | A1 | 7/1993 |
| EP | 0 368 257 | A1 | 5/1990 |
| EP | 1 443 625 | A2 | 8/2004 |
| JP | 2003-14807 | | 5/2003 |
| JP | 2004-244856 | | 9/2004 |
| JP | 2005-083057 | | 3/2005 |
| JP | 2006-090067 | | 4/2006 |

* cited by examiner

*Primary Examiner*—Bentsu Ro
*Assistant Examiner*—Erick Glass
(74) *Attorney, Agent, or Firm*—Morgan, Lewis & Bockius LLP

(57) ABSTRACT

A system for safely opening/closing a power window of a vehicle includes a main opening/closing device provided adjacent to a driver seat so as to open and close a window of a passenger seat. A sub opening/closing device is provided adjacent to a passenger seat so as to open and close a window of a passenger seat. A plurality of main electrodes of the main opening/closing device includes at least one main ground electrode for generating a signal. A main center electrode is electrically connected to a sub opening/closing device and to at least one main ground electrode by a main switch, and is disposed on a portion of a main plate to be prevented from being electrically connected to a main ground electrode when a main switch moves.

8 Claims, 10 Drawing Sheets

SYSTEM FOR SAFELY OPENING/CLOSING POWER WINDOW OF VEHICLE

CROSS-REFERENCE TO RELATED APPLICATION

This application claims priority to and the benefit of Korean Patent Application No. 10-2005-0108114 filed in the Korean Intellectual Property Office on Nov. 11, 2005, the entire contents of which are incorporated herein by reference.

BACKGROUND OF THE INVENTION (a) Field of the Invention

The present invention relates to a power window for a vehicle, and in particular, to a system for safely opening/closing a power window of a vehicle.

(b) Description of the Related Art

In general, a power window system for a vehicle includes a main opening/closing device provided adjacent to a driver seat, and a sub opening/closing device provided adjacent to a passenger seat.

A driver can open and close either a window of the driver seat or a window of the passenger seat using the main opening/closing device. In addition, a passenger can open and close the window of the passenger seat using the sub opening/closing device.

In particular, in order to open and close the window of the passenger seat using the main opening/closing device as well as the sub opening/closing device, both of the main opening/closing device and the sub opening/closing device are electrically connected to one controller. The controller receives signals generated from both of the main opening/closing device and the sub opening/closing device.

In addition, the controller raises the window of the passenger seat when a continuous up-signal is received from either of the main opening/closing device or the sub opening/closing device (such an operation is called a "manual up"), and the controller lowers the window of the passenger seat when a continuous down-signal is received therefrom (such an operation is called a "manual down"). Furthermore, the controller completely closes the window of the passenger seat when the up-signal and the down-signal are sequentially received from the main opening/closing device (such an operation is called an "auto up"), and the controller completely opens the window of the passenger seat when the down-signal and the up-signal are sequentially received therefrom (such an operation is called an "auto down"). Such an automatic system that can completely close or open the window is called a power window system.

In addition, such an up-signal or a down-signal is generated when a ground electrode and a selected electrode which are disposed on either of the main or the sub opening/closing device are contacted with each other.

However, such a conventional power window system may have some disadvantages. For example, in a case that the driver lowers the window of the passenger seat using the main opening/closing device when the passenger is raising it little by little, the window of the passenger seat using the sub opening/closing device, since the up-signal and the down-signal are sequentially transmitted to the controller, a problem may occur in that the window of the passenger seat will be completely closed. In particular, in a state in which an arm of the passenger is positioned on a top portion of the window, if the window of the passenger seat is set to completely closed, a problem may occur in that the arm is pressed by the window.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a system for safely opening/closing a power window of a vehicle having advantages of preventing a signal of a sub opening/closing device from generating when a window of a passenger seat is operated by a main opening/closing device.

A system for safely opening/closing a power window of a vehicle according to an exemplary embodiment of the present invention includes a main opening/closing device provided adjacent to a driver seat so as to open and close a window of a passenger seat, and a sub opening/closing device provided adjacent to a passenger seat so as to open and close a window of a passenger seat. The main opening/closing device includes a main plate on which a plurality of main electrodes are disposed, and a main switch that is disposed on the main plate such that it can movably contact selected main electrodes of the plurality of main electrodes such that either of an up-signal or a down-signal is output. The plurality of main electrodes includes at least one main ground electrode for generating a signal, and a main center electrode that is electrically connected to the sub opening/closing device and is electrically connected to the at least one main ground electrode by the main switch, and which is disposed on a predetermined portion of the main plate so as to be prevented from being electrically connected to the main ground electrode when the main switch moves.

In a further embodiment according to the present invention, the at least one main ground electrode includes a first main ground electrode disposed apart from a left side of the main center electrode by a first predetermined gap, and a second main ground electrode disposed apart from a right side of the main center electrode by the first predetermined gap.

In another further embodiment according to the present invention, the plurality of main electrodes further includes a first up-signal outputting main electrode disposed apart from a left side of the first main ground electrode by a second predetermined gap; a first down-signal outputting main electrode disposed apart from a left side of the first main ground electrode by a third predetermined gap, and disposed apart from a lower side of the first up-signal outputting main electrode by a fourth predetermined gap; a second down-signal outputting main electrode disposed apart from a right side of the second main ground electrode by the second predetermined gap; and a second up-signal outputting main electrode disposed apart from a right side of the second main ground electrode by the third predetermined gap, and disposed apart from a lower side of the second down-signal outputting main electrode by the fourth predetermined gap.

In another further embodiment according to the present invention, the main switch includes a main frame formed of a material with conductivity; at least one first main contact point disposed on the main frame, and contacting the main center electrode at a first position; a second main contact point disposed on the main frame, contacting the first main ground electrode at the first position and contacting the first up-signal outputting main electrode when the main frame moves to a left side by the second predetermined gap; a third main contact point disposed on the main frame, contacting the first main ground electrode at the first position and contacting the first down-signal outputting main electrode when the main frame moves to the left side by the third predetermined gap; a fourth main contact point disposed on the main frame, contacting the second main ground electrode at the first position and contacting the second down-signal outputting main electrode when the main frame moves to a right side by the second predetermined gap; and a fifth main contact point disposed on the main frame, contacting the second main ground electrode at the first position and contacting the second up-signal outputting main electrode when the main frame moves to the right side by the third predetermined gap.

In another further embodiment according to the present invention, the second main contact point and the third main contact point respectively contact a left edge of the first main ground electrode at the first position; the fourth main contact point and the fifth main contact point respectively contact a right edge of the second main ground electrode at the first position; and a width of the first main ground electrode and a width of the second main ground electrode are respectively larger than the second predetermined gap and the third predetermined gap, and are respectively smaller than a distance between a center line of the main center electrode and a right side of the first main ground electrode.

In another further embodiment according to the present invention, the sub opening/closing device includes a sub plate on which a plurality of sub electrodes are disposed, and a sub switch that is movably disposed on the sub plate and that contacts selected sub electrodes of the plurality of sub electrodes such that either of an up-signal or a down-signal is output, wherein the plurality of sub electrodes comprises at least one sub connection electrode electrically connected to the main center electrode.

In another further embodiment according to the present invention, the sub opening/closing device includes a sub plate on which a plurality of sub electrodes are disposed, and a sub switch that is movably disposed on the sub plate and that contacts selected sub electrodes of the plurality of sub electrodes such that either of an up-signal or a down-signal is output, wherein the plurality of sub electrodes comprises at least one sub connection electrode that is electrically connected to the main center electrode.

In another further embodiment according to the present invention, the plurality of sub electrodes further includes a sub center electrode for assisting the sub switch, wherein the at least one sub connection electrode includes a first sub connection electrode disposed apart from a left side of the sub center electrode by a fifth predetermined gap, and a second sub connection electrode disposed apart from a right side of the sub center electrode by the fifth predetermined gap.

In another further embodiment according to the present invention, the plurality of sub electrodes further includes a first up-signal outputting sub electrode disposed apart from a left side of the first sub connection electrode by a sixth predetermined gap; a first down-signal outputting sub electrode disposed apart from a left side of the first sub connection electrode by a seventh predetermined gap, and disposed apart from a lower side of the first up-signal outputting sub electrode by an eighth predetermined gap; a second down-signal outputting sub electrode disposed apart from a right side of the second sub connection electrode by the sixth predetermined gap; and a second up-signal outputting sub electrode disposed apart from a right side of the second sub connection electrode by the seventh predetermined gap, and disposed apart from a lower side of the second down-signal outputting sub electrode by the eighth predetermined gap.

In another further embodiment according to the present invention, the sub switch includes a sub frame that is formed of a material with conductivity; at least one the first sub contact points disposed on the sub frame and contacting the sub center electrode at a first position; a second sub contact point disposed on the sub frame, contacting the first sub connection electrode at the first position and contacting the first up-signal outputting sub electrode when the sub frame moves to a left side by the sixth predetermined gap; a third sub contact point disposed on the sub frame, contacting the first sub connection electrode at the first position and contacting the first down-signal outputting sub electrode when the sub frame moves to the left side by the seventh predetermined gap; a fourth sub contact point disposed on the sub frame, contacting the second sub connection electrode at the first position and contacting the second down-signal outputting sub electrode when the sub frame moves to a right side by the sixth predetermined gap; and a fifth sub contact point disposed on the sub frame, contacting the second sub connection electrode at the first position and contacting the second up-signal outputting sub electrode when the sub frame moves to the right side by the seventh predetermined gap.

In another further embodiment according to the present invention, the second sub contact point and the third sub contact point respectively contact a left edge of the first sub connection electrode at the first position; the fourth sub contact point and the fifth sub contact point respectively contact a right edge of the second sub connection electrode at the first position; and widths of the first sub connection electrode and the second sub connection electrode are respectively larger than the sixth predetermined gap and the seventh predetermined gap, and are respectively smaller than a distance between a center line of the sub center electrode and a right side of the first sub connection electrode.

DETAILED DESCRIPTION OF THE EMBODIMENTS

Figure 1:
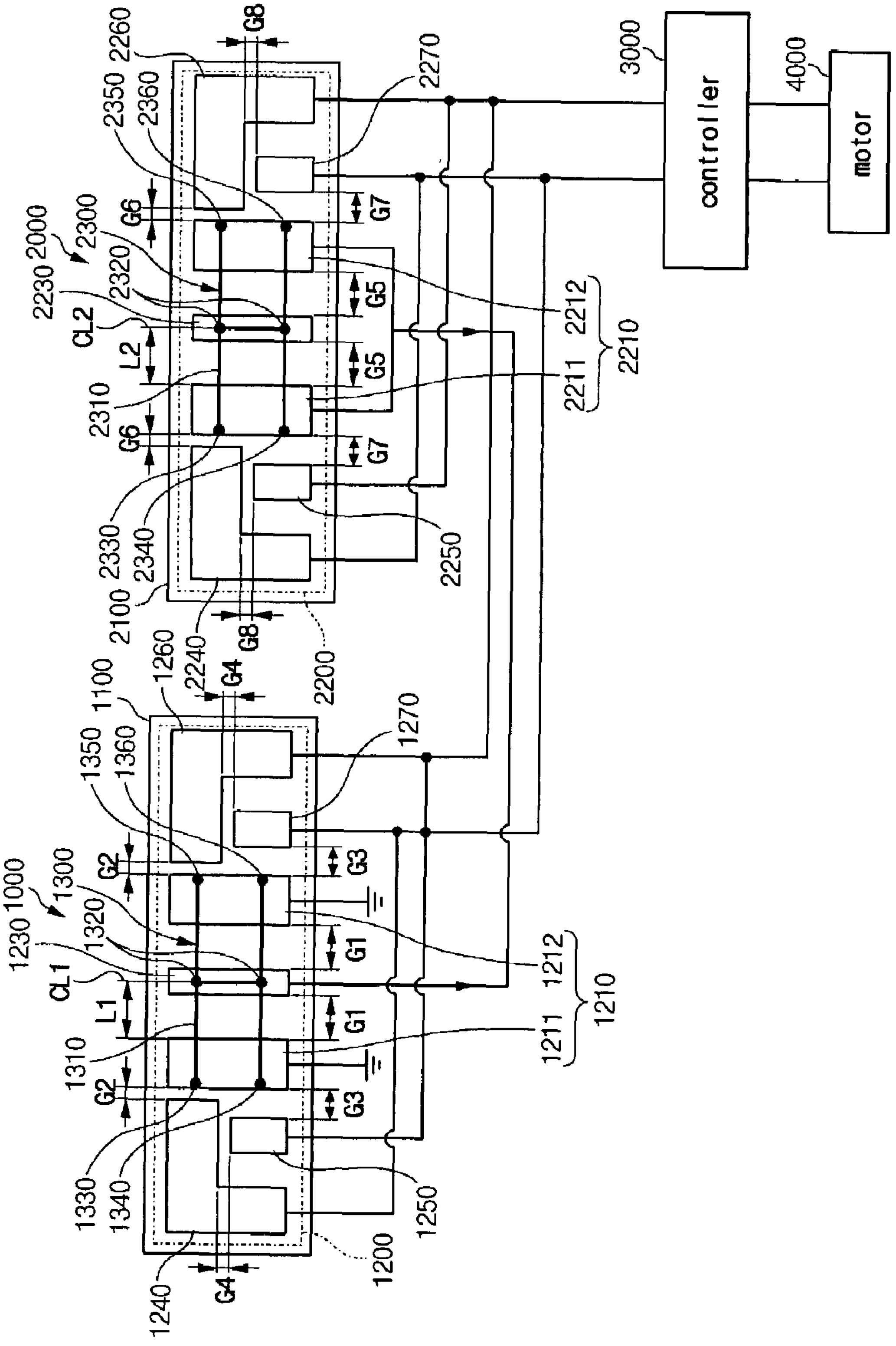
FIG. 1 is a circuit diagram showing a system for safely opening/closing a power window of a vehicle according to an exemplary embodiment of the present invention.

With reference to the accompanying drawings, the present invention will hereinafter be described in order for those skilled in the art to be able to implement the invention. As those skilled in the art would realize, the described embodiments may be modified in various different ways, all without departing from the spirit or scope of the present invention.

DESCRIPTION OF REFERENCE NUMERALS INDICATING PRIMARY ELEMENTS IN THE DRAWINGS

1000: main opening/closing device
1100: main plate
1200: main electrodes
1210: main ground electrode
1230: main center electrode
1300: main switch
2000: sub opening/closing device
2210: sub connection electrode A system for safely opening/closing a power window of a vehicle according to an exemplary embodiment of the present invention, as shown in FIG. 1, includes a main opening/closing device 1000, and a sub opening/closing device 2000. The main opening/closing device 1000 is provided adjacent to a driver seat (not shown), and is for opening and closing a window of a passenger seat (not shown). The sub opening/closing device 2000 is provided adjacent to a passenger seat, and is for opening and closing a window of a passenger seat.

The main opening/closing device 1000 will hereinafter be described in detail with reference to FIG. 1.

The opening/closing device 1000 includes a main plate 1100, and a main switch 1300. The main plate 1100 has a plurality of main electrodes 1200 disposed thereon. The main switch 1300 is movably disposed on the main plate 1100, and contacts selected main electrodes of the plurality of main electrodes 1200 such that either of an up-signal or a down-signal is output.

As an example, the above-mentioned plurality of main electrodes 1200 may include at least one main ground electrode 1210 and a main center electrode 1230.

The at least one main ground electrode 1210 exists in a ground state, and a corresponding signal is generated if a selected main electrode of the plurality of main electrodes 1200 is electrically connected to the main ground electrode 1210. The main center electrode 1230 is electrically connected to the sub opening/closing device 2000. In particular, the main center electrode 1230 is electrically connected to a sub connection electrode 2210 of the sub opening/closing device 2000. Furthermore, such a main center electrode 1230 is electrically connected to the at least one main ground electrode 1210 by the main switch 1300, and is prevented from being electrically connected to the main ground electrode 1210 when the main switch 1300 moves.

In addition, the above-mentioned at least one main ground electrode 1210 may include a first main ground electrode 1211 and a second main ground electrode 1212.

In more detail, the first main ground electrode 1211 is disposed apart from a left side of the main center electrode 1230 by a first predetermined gap G1, and the second main ground electrode 1212 is disposed apart from a right side the main center electrode 1230 by the first predetermined gap G1.

The above-mentioned plurality of main electrodes 1200 may further include a first up-signal outputting main electrode 1240, a first down-signal outputting main electrode 1250, a second down-signal outputting main electrode 1260, and a second up-signal outputting main electrode 1270.

In more detail, the first up-signal outputting main electrode 1240 is disposed apart from a left side of the first main ground electrode 1211 by a second predetermined gap G2.

The first down-signal outputting main electrode 1250 is disposed apart from a left side of the first main ground electrode 1211 by a third predetermined gap G3, and is disposed apart from a lower side of the first up-signal outputting main electrode 1240 by a fourth predetermined gap G4.

The second down-signal outputting main electrode 1260 is disposed apart from a right side of the second main ground electrode 1212 by the second predetermined gap G2.

The second up-signal outputting main electrode 1270 is disposed apart from a right side of the second main ground electrode 1212 by the third predetermined gap G3, and is disposed apart from a lower side of the second down-signal outputting main electrode 1260 by the fourth predetermined gap G4.

In addition, the main switch 1300 may include a main frame 1310 formed of a material with conductivity, at least one first main contact point 1320, a second main contact point 1330, a third main contact point 1340, a fourth main contact point 1350, and a fifth main contact point 1360.

In more detail, the at least one first main contact point 1320 is disposed on the main frame 1310, and maintains a state of contact with the main center electrode 1230 at a first position.

The second main contact point 1330 is disposed on the main frame 1310, it contacts the first main ground electrode 1211 at the first position, and it contacts the first up-signal outputting main electrode 1240 when the main switch 1300 moves to the left side by the second predetermined gap G2.

The third main contact point 1340 is disposed on the main frame 1310, it contacts the first main ground electrode 1211 at the first position, and it contacts the first down-signal outputting main electrode 1250 when the main switch 1300 moves to the left side by the third predetermined gap G3.

The fourth main contact point 1350 is disposed on the main frame 1310, it contacts the second main ground electrode 1212 at the first position, and it contacts the second down-signal outputting main electrode 1260 when the main switch 1300 moves to a right side by the second predetermined gap G2.

The fifth main contact point 1360 is disposed on the main frame 1310, it contacts the second main ground electrode 1212 at the first position, and it contacts the second up-signal outputting main electrode 1270 when the main switch 1300 moves to the right side by the third predetermined gap G3.

In addition, the second main contact point 1330 and the third main contact point 1340 respectively contact a left edge of the first main ground electrode 1211 at the first position. The fourth main contact point 1350 and the fifth main contact point 1360 respectively contact a right edge of the second main ground electrode 1212 at the first position. The width of the first main ground electrode 1211 and the width of the second main ground electrode 1212 may be respectively larger than the second predetermined gap G2 and the third predetermined gap G3, and may be respectively smaller than a distance L1 between a center line CL1 of the main center electrode 1230 and the right side of the first main ground electrode 1211.

The sub opening/closing device 2000 will hereinafter be described in detail with reference to FIG. 1.

The sub opening/closing device 2000 includes a sub plate 2100 and a sub switch 2300. The sub plate 2100 has a plurality of sub electrodes 2200 formed thereon. In addition, the sub switch 2300 is disposed on the sub plate 2100, and it contacts selected sub electrodes of the plurality of sub electrodes 2200 such that either of an up-signal or a down-signal is output.

In more detail, the plurality of sub electrodes 2200 may include at least one sub connection electrode 2210, and a sub center electrode 2230.

In further detail, the at least one sub connection electrode 2210 is electrically connected to the main center electrode 1230 of the main opening/closing device 1000. The sub center electrode 2230 only assists an operation of the sub switch 2300. Therefore, the sub center electrode 2230 may be eliminated from the sub opening/closing device 2000.

In addition, the at least one sub connection electrode 2210 may include a first sub connection electrode 2211 and a second sub connection electrode 2212.

In more detail, the first sub connection electrode 2211 is disposed apart from the left side of the sub center electrode 2230 by a fifth predetermined gap G5, and the second sub connection electrode 2212 is disposed apart from the right side of the sub center electrode 2230 by the fifth predetermined gap G5.

In addition, the plurality of sub electrodes 2200 may further includes a first up-signal outputting sub electrode 2240, a first down-signal outputting sub electrode 2250, a second down-signal outputting sub electrode 2260, and a second up-signal outputting sub electrode 2270.

In more detail, the first up-signal outputting sub electrode 2240 is disposed apart from the left side of the first sub connection electrode 2211 by a sixth predetermined gap G6.

The first down-signal outputting sub electrode 2250 is disposed apart from the left side of the first sub connection electrode 2211 by a seventh predetermined gap G7, and is disposed apart from the lower side of the first up-signal outputting sub electrode 2240 by an eighth predetermined gap G8.

The second down-signal outputting sub electrode 2260 is disposed apart from the right side of the second sub connection electrode 2212 by the sixth predetermined gap G6.

The second up-signal outputting sub electrode 2270 is disposed apart from the right side of the second sub connection electrode 2212 by the seventh predetermined gap G7, and is disposed apart from the lower side of the second down-signal outputting sub electrode 2260 by the eighth predetermined gap G8.

In addition, the sub switch 2300 may include a sub frame 2310 formed of a material with conductivity, at least one of a first sub contact point 2320, a second sub contact point 2330, a third sub contact point 2340, a fourth sub contact point 2350, and a fifth sub contact point 2360.

In more detail, the first sub contact point 2320 is disposed on the sub frame 2310, and contacts the sub center electrode 2230 at a first position.

The second sub contact point 2330 is disposed on the sub frame 2310, it contacts the first sub connection electrode 2211 at the first position, and it contacts the first up-signal outputting sub electrode 2240 when the sub switch 2300 moves to the left side by the sixth predetermined gap G6.

The third sub contact point 2340 is disposed on the sub frame 2310, it contacts the first sub connection electrode 2211 at the first position, and it contacts the first down-signal outputting sub electrode 2250 when the sub switch 2300 moves to the left side by the seventh predetermined gap G7.

The fourth sub contact point 2350 is disposed on the sub frame 2310, it contacts the second sub connection electrode 2212 at the first position, and it contacts the second down-signal outputting sub electrode 2260 when the sub switch 2300 moves to a right side by the sixth predetermined gap G6.

The fifth sub contact point 2360 is disposed on the sub frame 2310, it contacts the second sub connection electrode 2212 at the first position, and it contacts the second up-signal outputting sub electrode 2270 when the sub switch 2300 moves to the right side by the seventh predetermined gap G7.

In addition, the second sub contact point 2330 and the third sub contact point 2340 respectively contact the left edge of the first sub connection electrode 2211 at the first position. The fourth sub contact point 2350 and the fifth sub contact point 2360 respectively contact the right edge of the second sub connection electrode 2212 at the first position. The width of the first sub connection electrode 2211 and the width of the second sub connection electrode 2212 may be respectively larger than the sixth predetermined gap G6 and the seventh predetermined gap G7, and may be respectively smaller than a distance L2 between a center line CL2 of the sub center electrode 2230 and a right side of the first sub connection electrode 2211.

In addition, the system for safely opening/closing a power window of a vehicle according to the exemplary embodiment of the present invention may further include a controller 3000 and a motor 4000. The controller 3000 supplies electric power to a selected electrode, and receives a corresponding signal from the selected electrode, thereby calculating a control signal. The motor 4000 drives according to the control signal of the controller portion 3000.

An operation of the system for safely opening/closing a power window of a vehicle according to an exemplary embodiment of the present invention will hereinafter be described in detail with reference to FIGS. 2 to 10.

Figure 2:
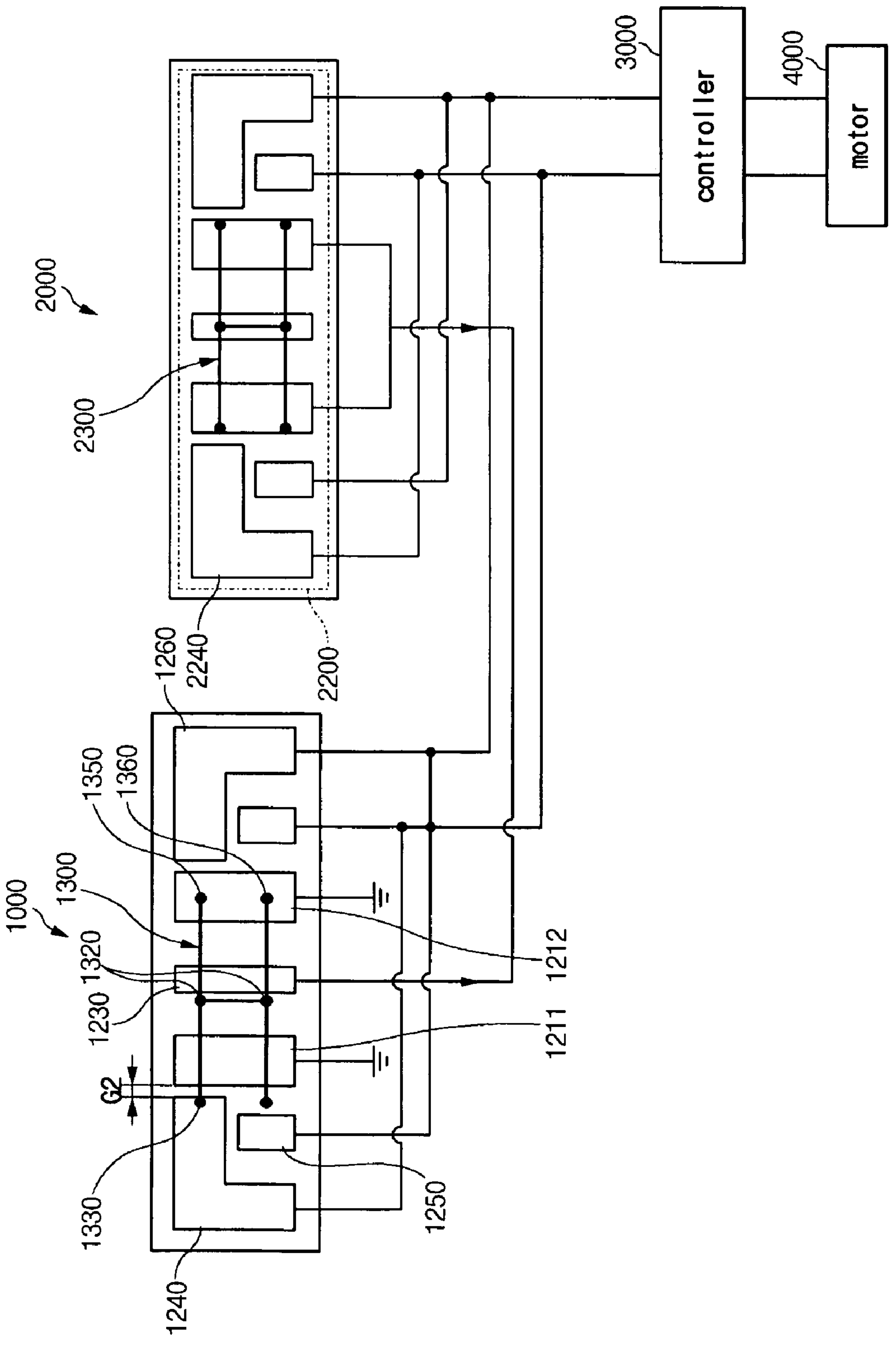
FIG. 2 shows a position of a main switch of a main opening/closing device in a “manual up” state in which a window of a passenger seat is raised by continuously actuating the main switch, in a system for safely opening/closing a power window of a vehicle according to an exemplary embodiment of the present invention.
Figure 3:
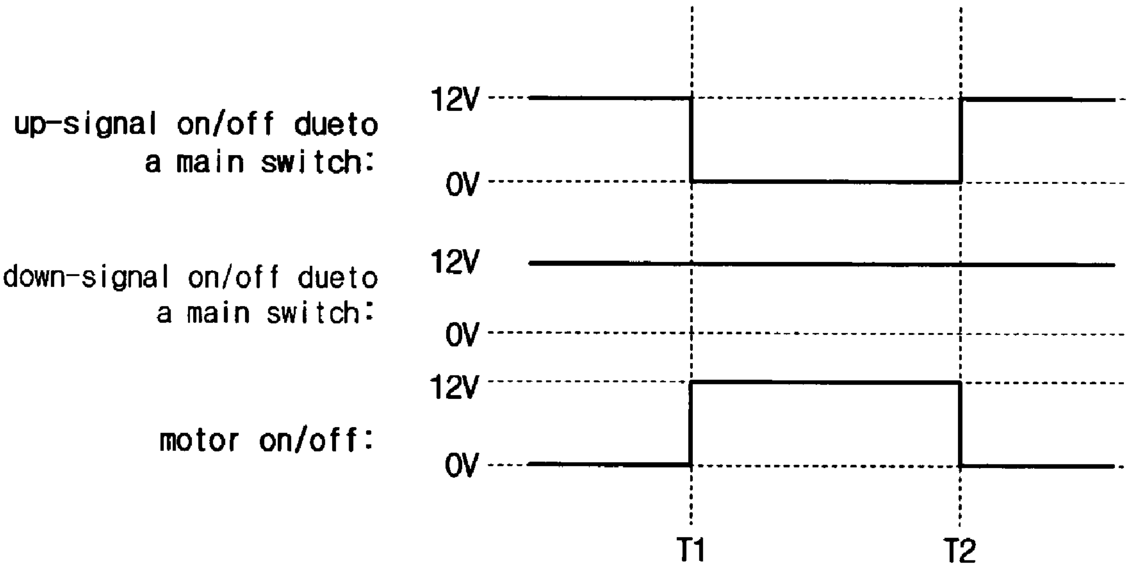
FIG. 3 shows a time-voltage graph of the “manual up” state of FIG. 2.

FIG. 2 shows a position of a main switch of a main opening/closing device in a "manual up" state in which a window of a passenger seat is raised by continuously actuating the main switch, in a system for safely opening/closing a power window of a vehicle according to an exemplary embodiment of the present invention. FIG. 3 shows a time-voltage graph of the "manual up" state of FIG. 2.

Figure 4:
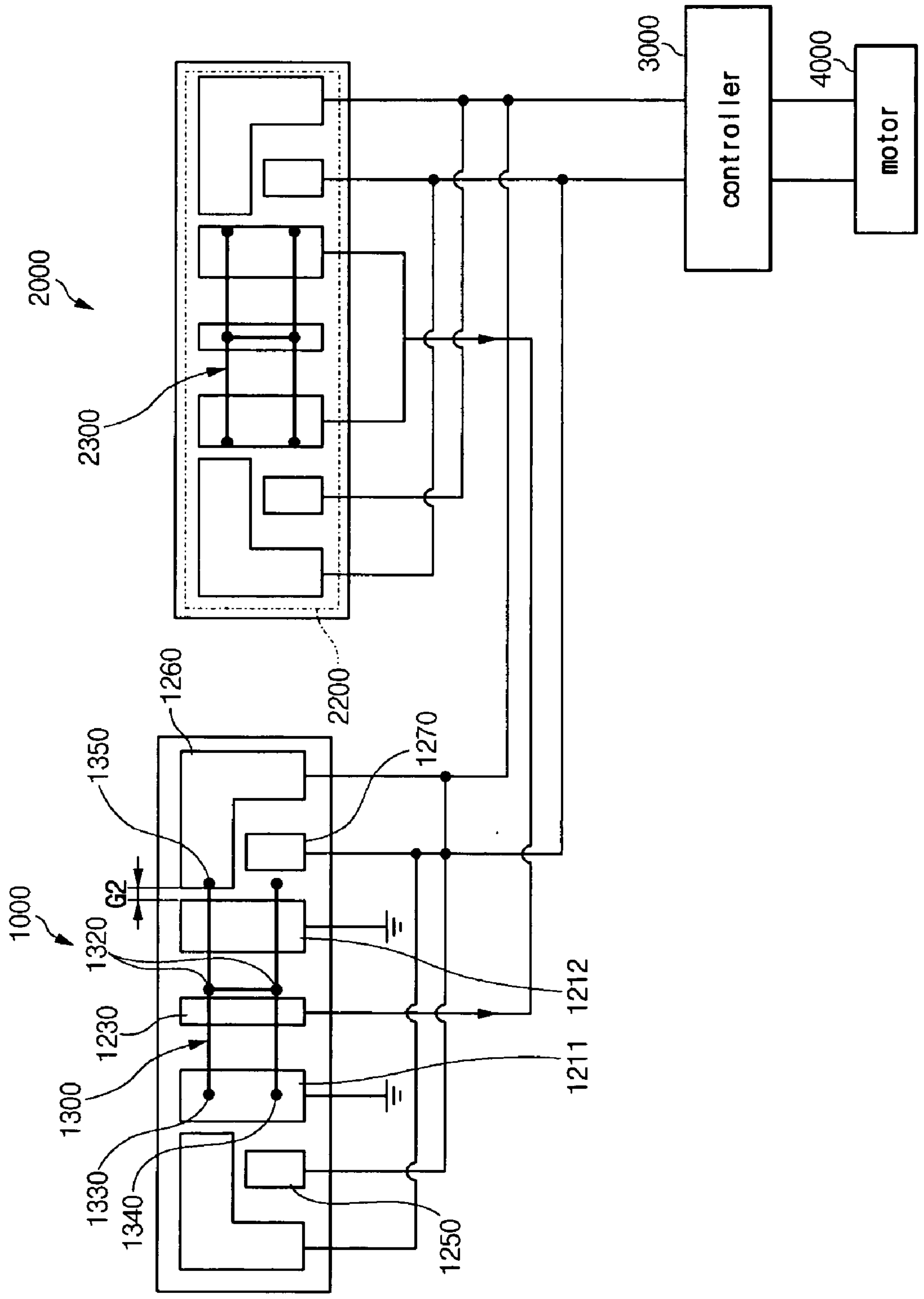
FIG. 4 shows a position of a main switch of a main opening/closing device in a “manual down” state in which a window of a passenger seat is lowered by continuously actuating the main switch, in a system for safely opening/closing a power window of a vehicle according to an exemplary embodiment of the present invention.
Figure 5:
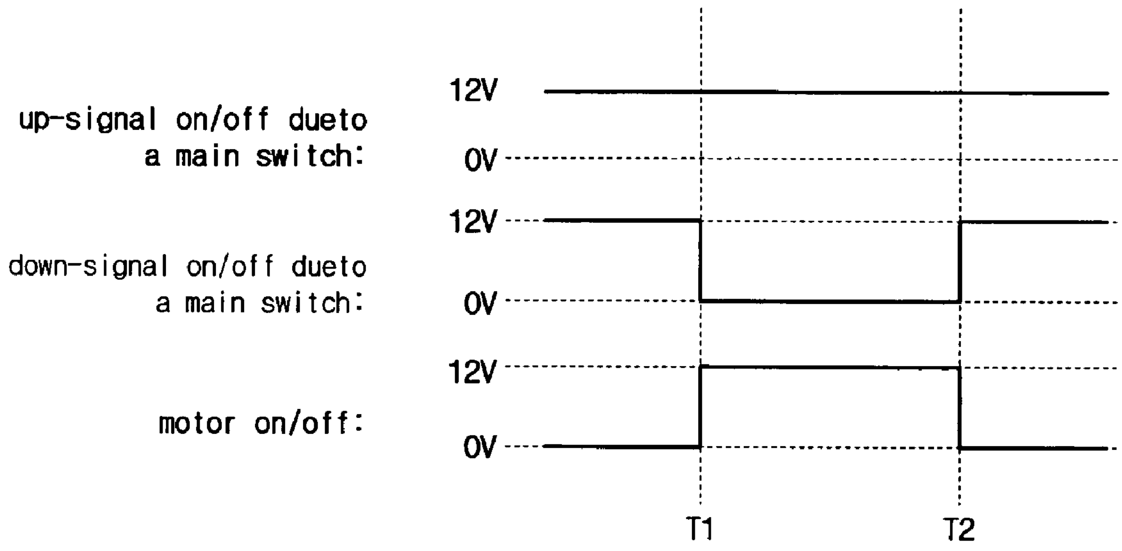
FIG. 5 shows a time-voltage graph of the “manual down” state of FIG. 4.

FIG. 4 shows a position of a main switch of a main opening/closing device in a "manual down" state in which a window of a passenger seat is lowered by continuously actuating the main switch, in a system for safely opening/closing a power window of a vehicle according to an exemplary embodiment of the present invention. FIG. 5 shows a time-voltage graph of the "manual down" state of FIG. 4.

Figure 6:
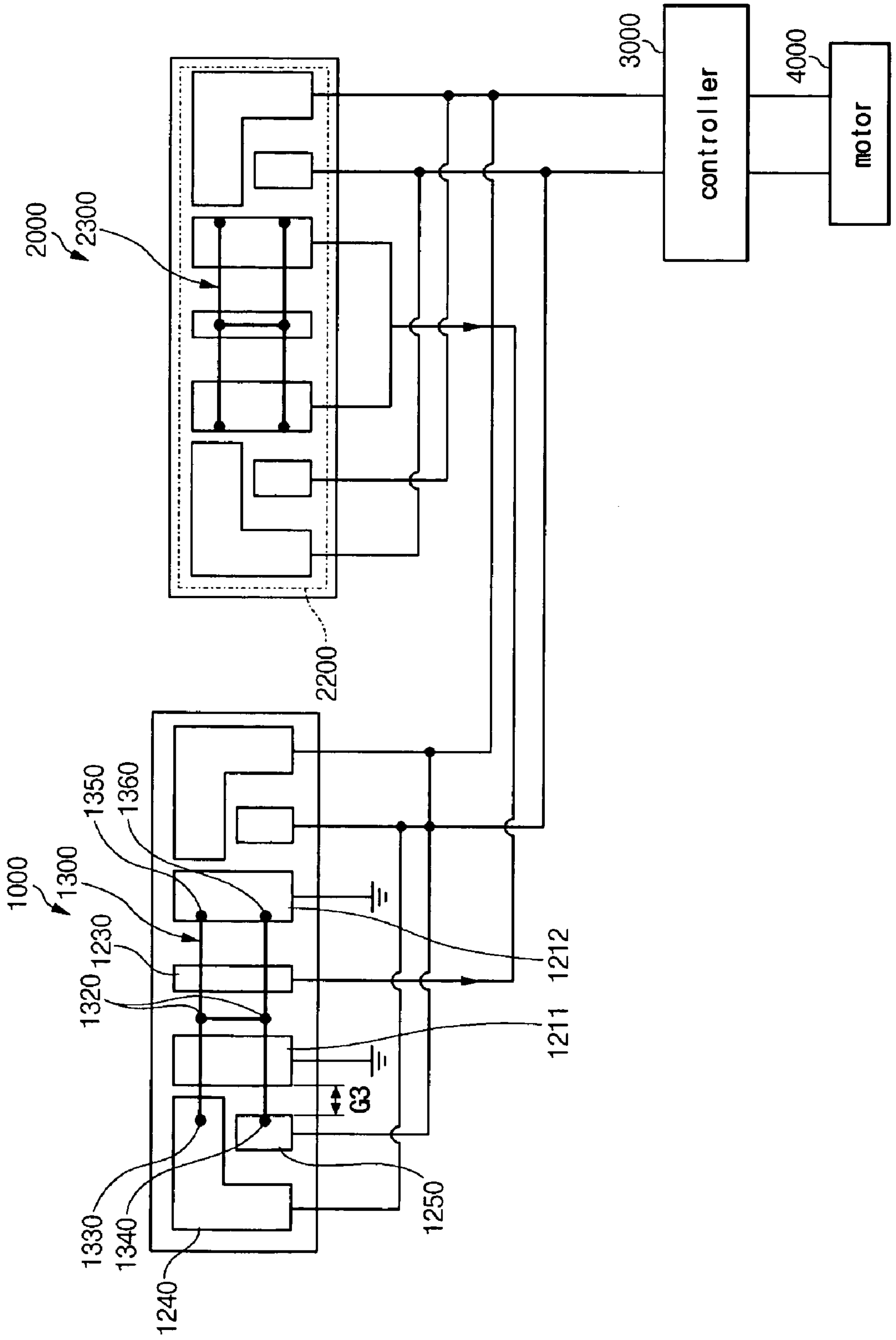
FIG. 6 shows a position of a main switch of a main opening/closing device in an “auto up” state in which a window of a passenger seat is completely raised, in a system for safely opening/closing a power window of a vehicle according to an exemplary embodiment of the present invention.
Figure 7:
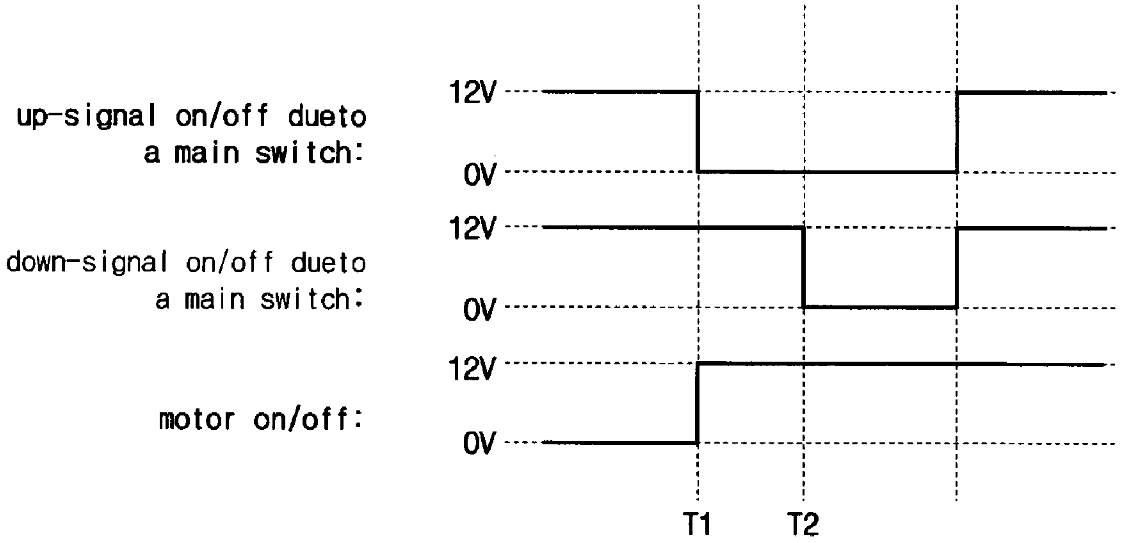
FIG. 7 shows a time-voltage graph of the “auto up” state of FIG. 6.

FIG. 6 shows a position of a main switch of a main opening/closing device in an "auto up" state in which a window of a passenger seat is completely raised, in a system for safely opening/closing a power window of a vehicle according to an exemplary embodiment of the present invention. FIG. 7 shows a time-voltage graph of the "auto up" state of FIG. 6.

Figure 8:
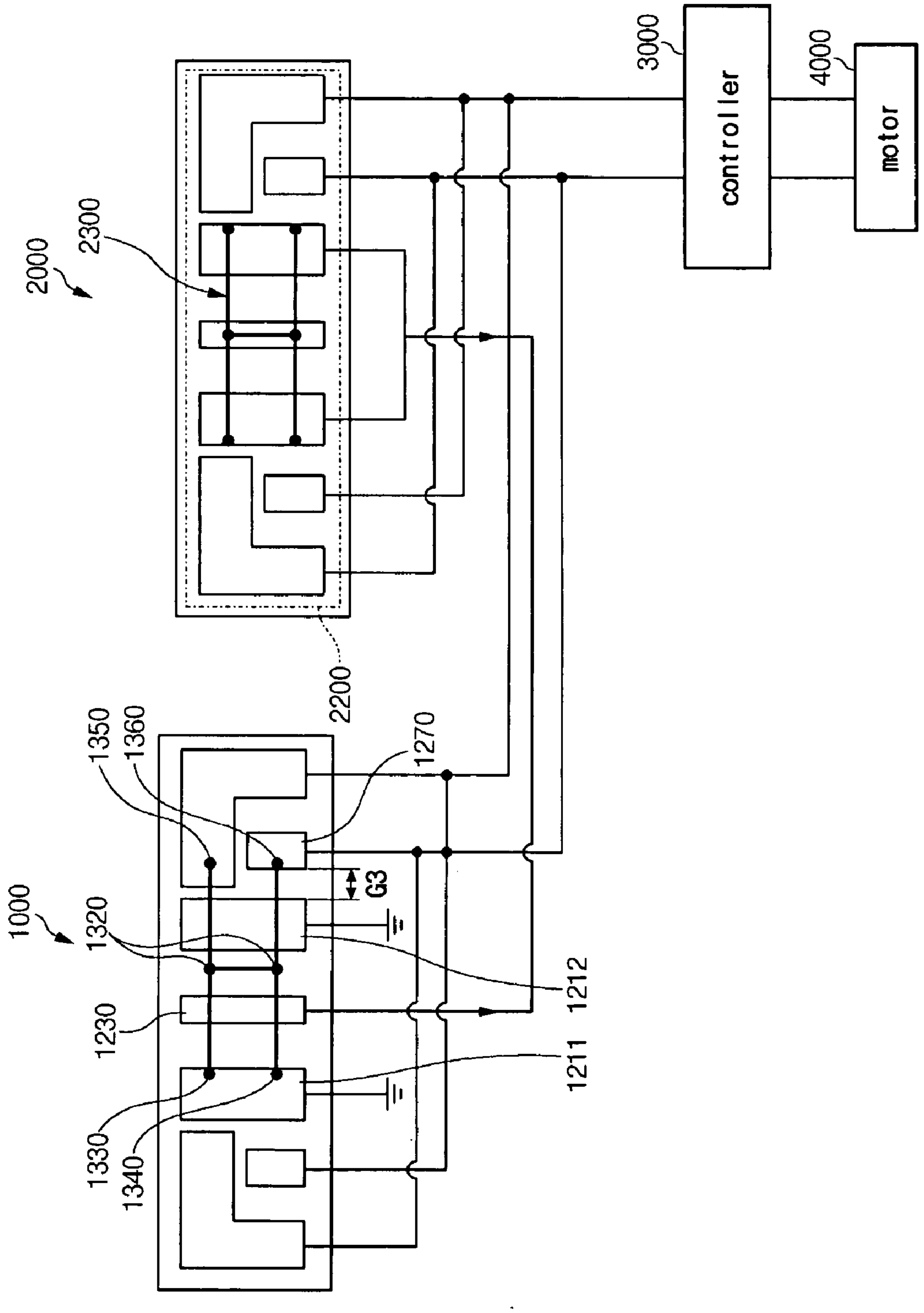
FIG. 8 shows a position of a main switch of a main opening/closing device in an “auto down” state in which a window of a passenger seat is completely lowered, in a system for safely opening/closing a power window of a vehicle according to an exemplary embodiment of the present invention.
Figure 9:
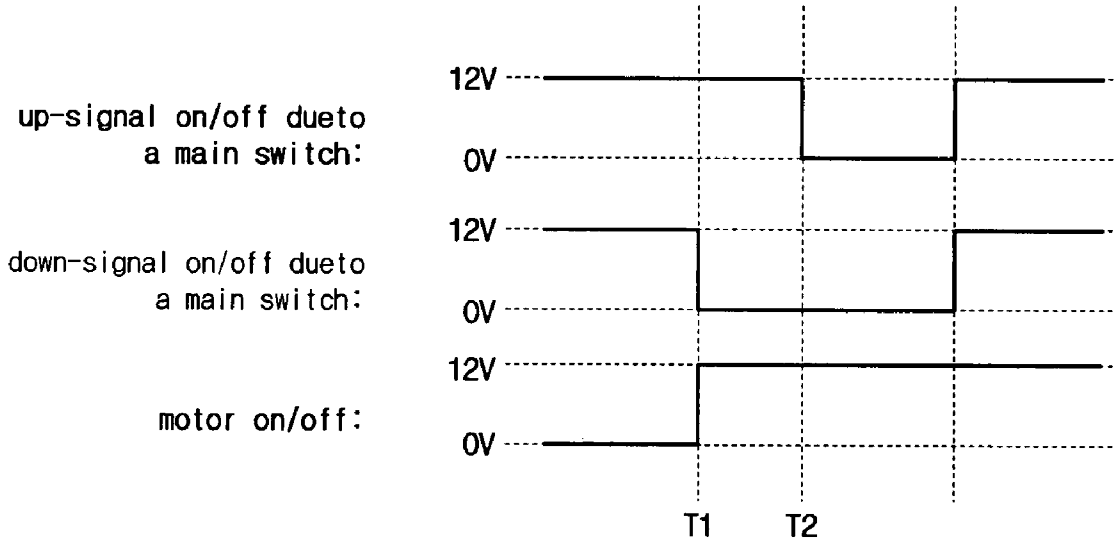
FIG. 9 shows a time-voltage graph of the “auto down” state of FIG. 8.

FIG. 8 shows a position of a main switch of a main opening/closing device in an "auto down" state in which a window of a passenger seat is completely lowered, in a system for safely opening/closing a power window of a vehicle according to an exemplary embodiment of the present invention. FIG. 9 shows a time-voltage graph of the "auto down" state of FIG. 8.

Figure 10:
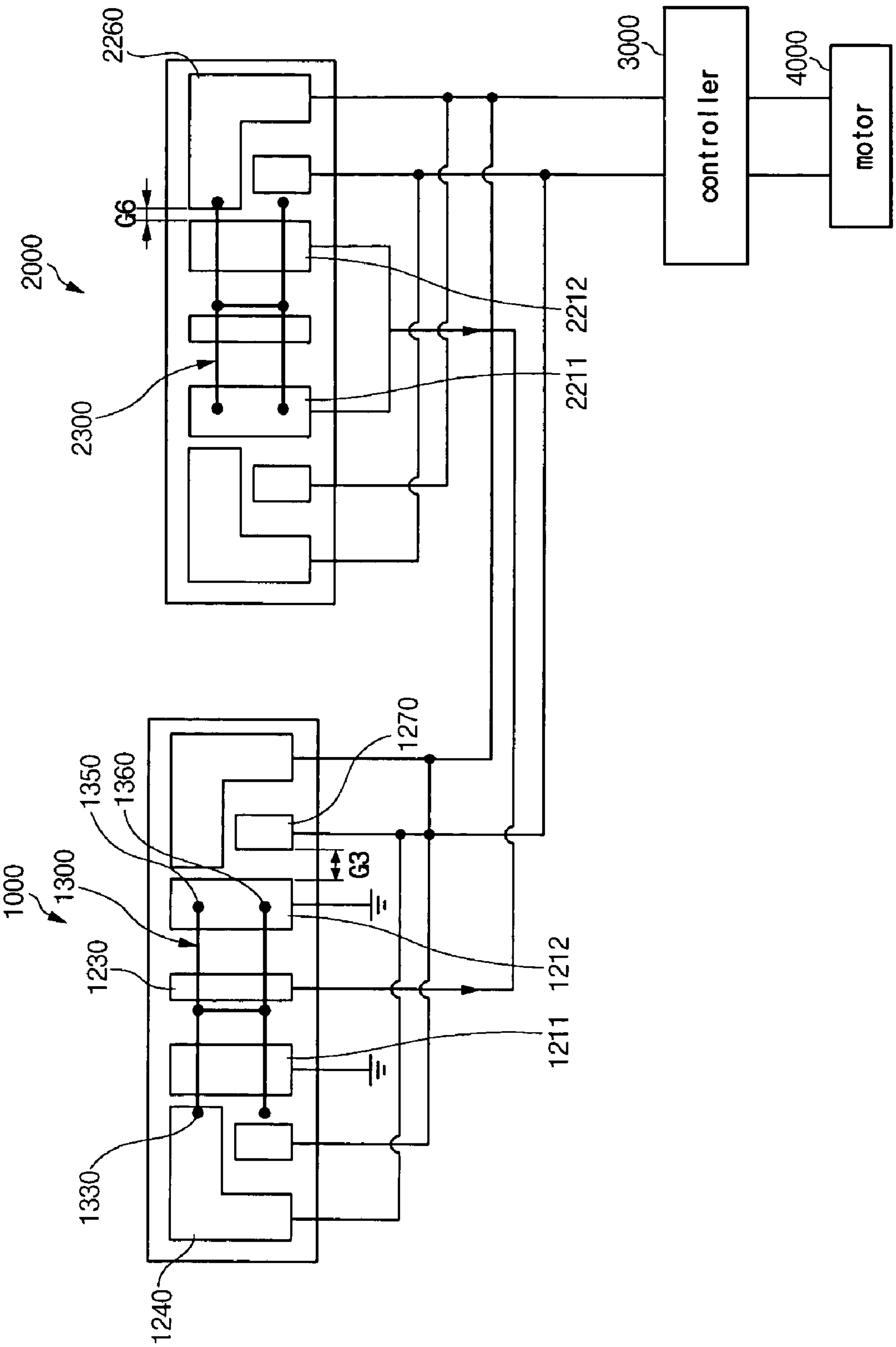
FIG. 10 shows a state in which an electrical connection between a sub connection electrode of a sub opening/closing device and a main ground electrode of a main opening/closing device is broken, when a main switch of a main opening/closing device moves while a sub switch of a sub opening/closing device is moving, in a system for safely opening/closing a power window of a vehicle according to an exemplary embodiment of the present invention.

FIG. 10 shows a state in which an electrical connection between a sub connection electrode of a sub opening/closing device and a main ground electrode of a main opening/closing device is broken, when a main switch of a main opening/closing device moves when a sub switch of a sub opening/closing device is moving, in a system for safely opening/closing a power window of a vehicle according to an exemplary embodiment of the present invention.

First, as shown in FIG. 2, if the main switch 1300 moves to the left side from the first position by the second predetermined gap G2, the first main contact point 1320 comes apart from the main center electrode 1230, and the main center electrode 1230 is prevented from being electrically connected to the first and the second main ground electrodes 1211 and 1212.

Accordingly, although the sub switch 2300 of the sub opening/closing device 2000 moves while the main switch 1300 of the main opening/closing device 1000 is moving, the plurality of sub electrodes 2200 of the sub opening/closing device 2000 are never grounded, and consequently the corresponding signal to the selected sub electrode cannot be generated.

In addition, if the main switch 1300 moves to the left side from the first position by the second predetermined gap G2, the second main contact point 1330 contacts the first up-signal outputting main electrode 1240, and the fourth and the fifth main contact points 1350 and 1360 contact the second main ground electrode 1212. Therefore, as shown in FIG. 3, at the time T1 when the voltage is “0”, the controller 3000 receives an up-signal from the main opening/closing device 1000. Consequently, the controller 3000 controls the motor 4000, and thereby the window (not shown) of the passenger seat is raised. In addition, until the time T2 when the up-signal stops, the window of the passenger seat is continuously elevated by the motor 4000 (such an operation is called a “manual up”). Controller 3000 may comprise a compressor, memory and associated hardware and software or firmware as may be selected and programmed by persons of ordinary skill in the art based on the teachings therein.

Second, as shown in FIG. 4, the main switch 1300 moves to the right side from the first position by the second predetermined gap G2, the first main contact point 1320 comes apart from the main center electrode 1230, and the main center electrode 1230 is prevented from being electrically connected to the first and the second main ground electrodes 1211 and 1212. Accordingly, even though the sub switch 2300 of the sub opening/closing device 2000 moves while the main switch 1300 of the main opening/closing device 1000 is moving, the plurality of sub electrodes 2200 of the sub opening/closing device 2000 are never grounded, and consequently the corresponding signal to the selected sub electrode cannot be generated.

In addition, if the main switch 1300 moves to the right side from the first position by the second predetermined gap G2, the fourth main contact point 1350 contacts the second down-signal outputting main electrode 1260, and the second and the third main contact points 1330 and 1340 contact with the first main ground electrode 1211. Therefore, as shown in FIG. 5, at the time T1 when the voltage is “0”, the controller 3000 receives a down-signal from the main opening/closing device 1000. Consequently, the controller 3000 controls the motor 4000, and thereby the window (not shown) of the passenger seat is lowered. In addition, until the time T2 when the down-signal stops, the window of the passenger seat is continuously lowered by the motor 4000 (such an operation is called a “manual down”).

Third, as shown in FIG. 6, the main switch 1300 moves to the left side from the first position by the third predetermined gap G3, the first main contact point 1320 comes apart from the main center electrode 1230, and the main center electrode 1230 is prevented from being electrically connected to the first and the second main ground electrodes 1211 and 1212. Accordingly, even though the sub switch 2300 of the sub opening/closing device 2000 moves while the main switch 1300 of the main opening/closing device 1000 is moving, the plurality of sub electrodes 2200 of the sub opening/closing device 2000 are never grounded, and consequently the corresponding signal to the selected sub electrode cannot be generated.

In addition, if the main switch 1300 moves to the left side from the first position by the third predetermined gap G3, the second main contact point 1330 contacts the first up-signal outputting main electrode 1240, and thereafter the third main contact point 1340 contacts the first down-signal outputting main electrode 1250. Further, the fourth and the fifth main contact points 1350 and 1360 contact the second main ground electrode 1212. Therefore, as shown in FIG. 7, at the time T1 when the voltage is “0” through the first up-signal outputting main electrode 1240, the controller 3000 receives an up-signal from the main opening/closing device 1000. At the time T2 when the voltage is “0” through the first down-signal outputting main electrode 1250, the controller 3000 receives a down-signal from the main opening/closing device 1000. Consequently, the controller 3000 controls the motor 4000, and thereby the window (not shown) of the passenger seat is wholly closed (such an operation is called an “auto up”).

Fourth, as shown in FIG. 8, the main switch 1300 moves to the right side from the first position by the third predetermined gap G3, the first main contact point 1320 comes apart from the main center electrode 1230, and the main center electrode 1230 is prevented from being electrically connected to the first and the second main ground electrodes 1211 and 1212. Accordingly, even though the sub switch 2300 of the sub opening/closing device 2000 moves while the main switch 1300 of the main opening/closing device 1000 is moving, the plurality of sub electrodes 2200 of the sub opening/closing device 2000 are never grounded, and consequently the corresponding signal to the selected sub electrode cannot be generated.

In addition, if the main switch 1300 moves to the right side from the first position by the third predetermined gap G3, the fourth main contact point 1350 contacts the second down-signal outputting main electrode 1260, and thereafter the fifth main contact point 1360 contacts the second up-signal outputting main electrode 1270. In addition, the second and the third main contact points 1330 and 1340 contact the first main ground electrode 1211. Therefore, as shown in FIG. 9, at the time T1 when the voltage is “0” through the second down-signal outputting main electrode 1260, the controller 3000 receives a down-signal from the main opening/closing device 1000. At the time T2 when the voltage is “0” through the second up-signal outputting main electrode 1270, the controller 3000 receives an up-signal from the main opening/closing device 1000. Consequently, the controller 3000 controls the motor 4000, and thereby the window (not shown) of the passenger seat is completely raised (such an operation is called an “auto down”).

Fifth, as shown in FIG. 10, if the main switch 1300 of the main opening/closing device 1000 moves while the sub switch 2300 of the sub opening/closing device 200 is moving to the right side from the first position by the sixth predetermined gap G6, the main center electrode 1230 which is connected to the first and the second sub connection electrodes 2211 and 2212 is prevented from being electrically connected to the first and the second main ground electrodes 1211 and 1212.

Accordingly, if the main switch 1300 of the main opening/closing device 1000 moves while the sub switch 2300 of the sub opening/closing device 2000 is moving, the second down-signal outputting sub electrodes 2260 of the sub opening/closing device 2000 are never grounded, and consequently the down-signal therefrom cannot be generated. However, the second main contact point 1330 of the main opening/closing device 1000 contacts the first up-signal outputting main electrode 1240, and the fourth and the fifth main contact points 1350 and 1360 contact the second main ground electrode 1212, and accordingly the controller 3000 controls the window (not shown) of the passenger seat to receive the up-signal which is transmitted from the main opening/closing device 1000.

As has been explained, a system for safely opening/closing a power window of a vehicle according to an exemplary embodiment of the present invention may have the following advantages.

According to the embodiment of the present invention, in a case in which the sub switch of the sub opening/closing device moves while the main switch of the main opening/closing device is moving, or in which the main switch of the main opening/closing device moves while the sub switch of the main opening/closing device is moving, a corresponding signal from only the main opening/closing device can be generated.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for safely opening/closing a power window of a vehicle, comprising:

a main opening/closing device for provision adjacent to a driver seat so as to open and close a window of a passenger seat; and a sub opening/closing device for provision adjacent to a passenger seat so as to open and close a window of a passenger seat, wherein the main opening/closing device comprises a main plate on which a plurality of main electrodes are disposed, and a main switch movably disposed on the main plate, and contacting selected main electrodes of the plurality of main electrodes such that either of an up-signal or a down-signal is output, and wherein the plurality of main electrodes comprises at least one main ground electrode for generating a signal, and a main center electrode electrically connected to the sub opening/closing device, and electrically connected to the at least one main ground electrode by the main switch, and disposed on a predetermined portion of the main plate so as to be prevented from being electrically connected to the main ground electrode when the main switch moves;

wherein the at least one main ground electrode comprises:

a first main ground electrode disposed apart from a left side of the main center electrode by a first predetermined gap; and a second main ground electrode disposed apart from a right side of the main center electrode by the first predetermined gap;

wherein the plurality of main electrodes further comprises:

a first up-signal outputting main electrode disposed apart from a left side of the first main ground electrode by a second predetermined gap;

a first down-signal outputting main electrode disposed apart from a left side of the first main ground electrode by a third predetermined gap, and disposed apart from a lower side of the first up-signal outputting main electrode by a fourth predetermined gap;

a second down-signal outputting main electrode disposed apart from a right side of the second main ground electrode by the second predetermined gap; and a second up-signal outputting main electrode disposed apart from a right side of the second main ground electrode by the third predetermined gap, and disposed apart from a lower side of the second down-signal outputting main electrode by the fourth predetermined gap; and wherein the main switch comprises:

a main frame formed of a material with conductivity;

at least one first main contact point disposed on the main frame, and contacting the main center electrode at a first position;

a second main contact point disposed on the main frame, contacting the first main ground electrode at the first position, and contacting the first up-signal outputting main electrode when the main frame moves to a left side by the second predetermined gap;

a third main contact point disposed on the main frame, contacting the first main ground electrode at the first position, and contacting the first down-signal outputting main electrode when the main frame moves to the left side by the third predetermined gap;

a fourth main contact point disposed on the main frame, contacting the second main ground electrode at the first position, and contacting the second down-signal outputting main electrode when the main frame moves to a right side by the second predetermined gap; and a fifth main contact point disposed on the main frame, contacting the second main ground electrode at the first position, and contacting the second up-signal outputting main electrode when the main frame moves to the right side by the third predetermined gap.

2. The system of claim 1, wherein:

the second main contact point and the third main contact point respectively contact a left edge of the first main ground electrode at the first position;

the fourth main contact point and the fifth main contact point respectively contact a right edge of the second main ground electrode at the first position; and a width of the first main ground electrode and a width of the second main ground electrode are respectively larger than the second predetermined gap and the third predetermined gap, and are respectively smaller than a distance between a center line of the main center electrode and a right side of the first main ground electrode.

3. The system of claim 1, wherein the sub opening/closing device comprises:

a sub plate on which a plurality of sub electrodes are disposed; and a sub switch movably disposed on the sub plate, and that contacts a selected sub electrodes of the plurality of sub electrodes such that either of an up-signal or a down-signal is output, wherein the plurality of sub electrodes comprises at least one sub connection electrode electrically connected to the main center electrode.

4. The system of claim 2, wherein the sub opening/closing device comprises:

a sub plate on which a plurality of sub electrodes are disposed; and a sub switch movably disposed on the sub plate, and contacting selected sub electrodes of the plurality of sub electrodes such that either of an up-signal or a down-signal is output, wherein the plurality of sub electrodes comprises at least one sub connection electrode electrically connected to the main center electrode.

5. The system of claim 4, wherein the plurality of sub electrodes further comprises a sub center electrode for assisting the sub switch, wherein the at least one sub connection electrode comprises:

a first sub connection electrode disposed apart from a left side of the sub center electrode by a fifth predetermined gap; and a second sub connection electrode disposed apart from a right side of the sub center electrode by the fifth predetermined gap.

6. The system of claim 5, wherein the plurality of sub electrodes further comprises:

a first up-signal outputting sub electrode disposed apart from a left side of the first sub connection electrode by a sixth predetermined gap;

a first down-signal outputting sub electrode disposed apart from a left side of the first sub connection electrode by a seventh predetermined gap, and disposed apart from a lower side of the first up-signal outputting sub electrode by an eighth predetermined gap;

a second down-signal outputting sub electrode disposed apart from a right side of the second sub connection electrode by the sixth predetermined gap; and a second up-signal outputting sub electrode disposed apart from a right side of the second sub connection electrode by the seventh predetermined gap, and disposed apart from a lower side of the second down-signal outputting sub electrode by the eighth predetermined gap.

7. The system of claim 6, wherein the sub switch comprises:

a sub frame formed of a material with conductivity;

at least one first sub contact point disposed on the sub frame, and contacting the sub center electrode at a first position;

a second sub contact point disposed on the sub frame, contacting the first sub connection electrode at the first position, and contacting the first up-signal outputting sub electrode when the sub frame moves to a left side by the sixth predetermined gap;

a third sub contact point disposed on the sub frame, contacting the first sub connection electrode at the first position, and contacting the first down-signal outputting sub electrode when the sub frame moves to the left side by the seventh predetermined gap;

a fourth sub contact point disposed on the sub frame, contacting the second sub connection electrode at the first position, and contacting the second down-signal outputting sub electrode when the sub frame moves to a right side by the sixth predetermined gap; and a fifth sub contact point disposed on the sub frame, contacting the second sub connection electrode at the first position, and contacting the second up-signal outputting sub electrode when the sub frame moves to the right side by the seventh predetermined gap.

8. The system of claim 7, wherein:

the second sub contact point and the third sub contact point respectively contact a left edge of the first sub connection electrode at the first position;

the fourth sub contact point and the fifth sub contact point respectively contact a right edge of the second sub connection electrode at the first position; and a width of the first sub connection electrode and a width of the second sub connection electrode are respectively larger than the sixth predetermined gap and the seventh predetermined gap, and are respectively smaller than a distance between a center line of the sub center electrode and a right side of the first sub connection electrode.

* * * * *